H. Y. NORWOOD.
VALVE MECHANISM.
APPLICATION FILED MAR. 7, 1919.

1,425,412.

Patented Aug. 8, 1922.

Witnesses:

INVENTOR
Harry Y. Norwood
BY
his ATTORNEYS

UNITED STATES PATENT OFFICE.

HARRY Y. NORWOOD, OF ROCHESTER, NEW YORK, ASSIGNOR TO TAYLOR INSTRUMENT COS., OF ROCHESTER, NEW YORK, A CORPORATION OF NEW YORK.

VALVE MECHANISM.

1,425,412.　　　　　Specification of Letters Patent.　　Patented Aug. 8, 1922.

Application filed March 7, 1919. Serial No. 281,199.

*To all whom it may concern:*

Be it known that I, HARRY Y. NORWOOD, of Rochester, in the county of Monroe and State of New York, have invented certain new and useful Improvements in Valve Mechanism; and I do hereby declare the following to be a full, clear, and exact description of the same, reference being had to the accompanying drawings, forming a part of this specification, and to the reference numerals marked thereon.

This invention relates to mechanically operated valves, and, more particularly, to valves of the type provided with a device sensitive to fluid pressure or other controlling agency by means of which the valve may be mechanically operated from a distant point.

One object of the invention is to provide a device of this character which is efficient in construction and positive and reliable in operation. Another object is to provide such a valve having advantageous arrangements for regulating the action of the sensitive actuating device, as well as for counter-balancing the weight of the parts and cushioning the action of the latter against shock. A further object is to provide a device having such features which at the same time comprises comparatively few parts of simple and durable construction and low cost of manufacture. To these and other ends the invention consists in certain improvements and combinations of parts, all as will be hereinafter more fully described, the novel features being pointed out in the claims at the end of the specification.

In the drawings.

Similar reference numerals in the several figures indicate the same parts.

Figure 1:
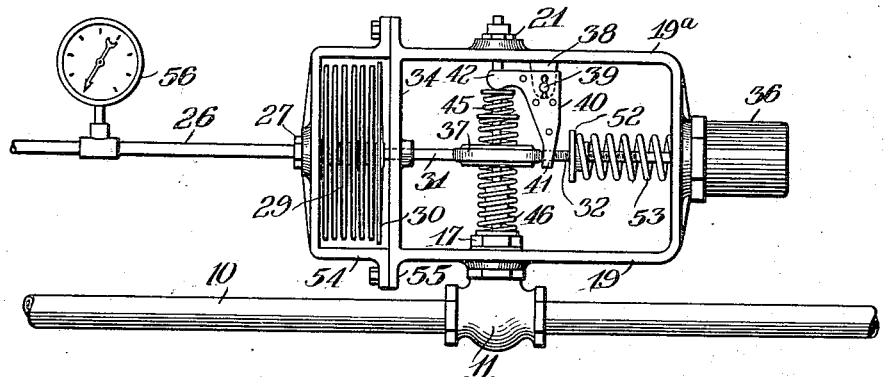
Figure 1 is a side elevation of the device connected with a conduit in which the action of fluid is to be controlled.

In the present embodiment of the invention, which is selected merely to exemplify the principles involved, 10 represents a conduit in which the action of fluid is to be controlled and 11 is the casing of a valve inserted in the conduit for this purpose, having, preferably, a partition 12 provided with an opening 13 at the upper end of which is formed a seat 14 to receive the valve member 15 carrying an upwardly projecting stem 16. The valve stem is longitudinally movable in a bearing in a cap or nut 17 having threaded engagement with the upper end of a neck 18 extending upwardly from the valve casing 11 and projecting through and in threaded engagement with the lower side 19 of a substantially rectangular frame 20 forming a support for the various parts of the mechanism. The upper side 19ª of this frame carries a screw plug 21 forming a second bearing for valve spindle 16.

The neck 18 of valve casing 11 is formed with the usual stuffing box 22, filled with packing material 23 compressed in the box by the cap 17, thus forming a pressure tight bearing for the valve stem. It is to be understood that this or other suitable forms of construction of the valve proper may be used, the form shown being merely that which is preferred at the present time.

In the present instance, the form of sensitive actuating device employed is of the diaphragm type operated by fluid pressure, although it is contemplated that other forms of sensitive devices may be used. To this end a pipe 26 is shown threaded into the bore of a plug 27 in one end of the supporting frame and communicating with a nipple 28 also threaded into the plug and forming part of a pressure actuated diaphragm, or series of diaphragms, 29, of any suitable construction, that shown comprising preferably a plurality of flexible walls forming collapsible envelopes communicating with each other in series in the usual manner and adapted to be expanded or extended upon application of pressure through the nipple 28. The other end of this sensitive device is provided with a stiffening plate 30 connected with one end 31 of a spindle 32 longitudinally slidable in a bearing 33 on a cross-bar 34 of the supporting frame. The other end 32ª of this spindle is slidably supported in a bearing 35 formed in the end of a socket 36 attached to the end of the supporting frame. It will be apparent from the nature of this construction that variations in pressure of the fluid in pipe 26 will contract or expand the sensitive device 29 and thereby produce longitudinal motion of the spindle 32. As this spindle is substantially in the same plane as valve stem 16 it is provided adjacent its center portion with a yoke 37 threadedly engaging the adjacent ends of the spindle and surrounding the valve stem to avoid interference therewith.

The upper side 20 of the supporting frame has a depending lug 38 on which is pivotally supported at 39 a lever, preferably in the form of a bell crank 40, constructed for purposes of simplicity of plates secured together in spaced relation as illustrated in the drawings. The bell crank has arms of unequal length, the longer of which, 41, straddles loosely the spindle 32 and engages the adjacent shoulder of yoke 37. The shorter arm similarly straddles valve stem 16 and bears against a collar 43 slidable on the stem and supported from below by a comparatively stiff spring 45 which in turn is supported at its lower end on a disk 44 fixed to the stem. Another spring 46 bears at its upper end against disk 44 and at its lower end against a collar 47 which is slidable on the stem and abuts the threaded cap 17. Valve stem 16 is formed in two parts slightly spaced at 48 and united by a coupling sleeve 49 with which the adjacent ends of the stem are threadedly connected. After the lower portion of the valve stem is screwed into the sleeve the upper portion is adjusted in the sleeve to properly adjust the valve in its open position with reference to the corresponding position of bell crank 40 and yoke 37, after which the sleeve is fixed to the upper portion of the valve stem by means of a set screw 50.

Spindle 32 is provided at 51 with a threaded portion with which engages a threaded adjustable sleeve 52, against which bears one end of a spring 53 the other end of which bears against the outer end of the socket 36, so that this spring tends to collapse diaphragm 29 and control its expansion. By means of the adjustable collar 52 the expansive movement of the diaphragm may be regulated to the desired extent in conjunction with the varying pressure in pipe 26.

The sensitive device or diaphragm 29 may be supported in an open frame as shown, or, if desired may obviously be protected by a closed casing. In the present instance, the portion of frame 20 supporting the diaphragm is bolted to the remainder of the frame by means of flanges 55 to afford access to the diaphragm but an integral construction of the frame might, of course, be employed. A dial 56 of any suitable type is provided for indicating the pressure in pipe 26.

Figure 2:
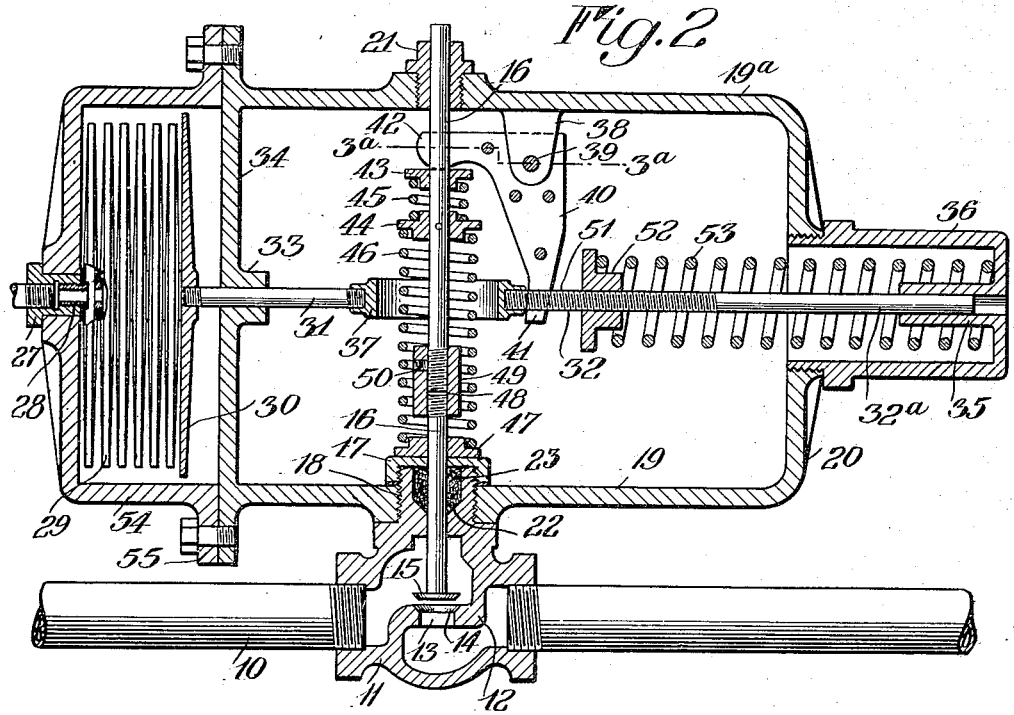
Fig. 2 is a longitudinal vertical section of the same.
Figure 3:
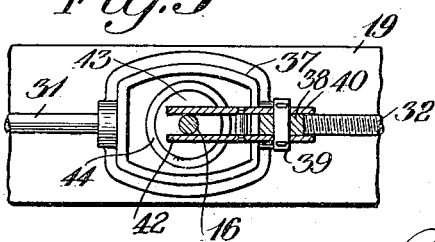
Fig. 3 is a horizontal section on the line 3ª—3ª of Fig. 2 as seen from above.

In connection with the above description of the construction the operation of the device will be made clear by a brief description. An increase of pressure in pipe 26, expanding diaphragm 29, moves the connected spindle to the right, Fig. 2, and through the yoke shoulder turns bell crank 40 in an anti-clockwise direction, thereby depressing the valve stem and eventually closing the valve. The regulating collar 52 permits of so adjusting this action that the valve will be closed at a selected pressure in the pipe 26. Decrease of pressure in pipe 26 below this amount will, on the other hand, allow the diaphragm to be collapsed so that the connected spindle moves to the left, releasing arm 41 of the bell crank and permitting spring 46 to turn the bell crank and open the valve. Should the mechanism be stopped with a shock at either limit of its movement, as when the valve engages its seat, this shock is absorbed by spring 45 which thus serves as a cushion for the diaphragm and other parts and preserves them from injury thereby.

The arrangement of the bell crank, with its longer arm connected to the diaphragm and its shorter arm with the valve, provides a multiplication of the force exerted by the diaphragm and applied to the valve, overcoming any lack of balance in the valve or friction of its parts and thus insuring positive and reliable operation.

The provision of spring 53 for regulating the expansion of the diaphragm with relation to the action of the valve, independently of the springs for counterbalancing the weight of the valve and cushioning the movement of the parts, affords a means for accurately adjusting the operation of the valve corresponding to any desired pressure in the controlling agency.

The conduit 10 may be the final one to be controlled, or may supply the fluid for operating in turn one or more relays for controlling the final conduit.

The mechanism necessitates but a few parts which are readily accessible, and simple and durable in construction and also economical to manufacture.

I claim as my invention:

1. In an automatic valve, the combination with a valve housing having a valve seat and a valve therefor, of a substantially rectangular frame carried by said valve housing, a stem for said valve extending laterally through said frame and provided with a spring counterbalancing said stem and valve, a pressure sensitive device at one end of said frame having an element extending longitudinally therethrough and provided with a spring for regulating said device, a bell crank pivotally mounted on said frame in connection with said element and spindle and cushioning means to absorb the shock of seating of said valve.

2. In an automatic valve, the combination with a valve housing having a valve seat and a valve therefor, of a housing frame carried by said valve housing, a stem for said valve extending through bearings in opposite sides of said frame and provided with a spring counterbalancing said valve and stem, a pressure sensitive device on said frame having an element extending transversely of said valve stem through bearings in opposite sides of said frame, adjustable regulating means for said device comprising a spring, a bell crank on said frame connected with said element and stem for actuating said valve and cushioning means to absorb the shock of seating of said valve.

3. In an automatic valve, the combination with a valve housing having a valve and a seat therefor, of a substantially plane shaped, rectangular frame carried by said housing, a stem for said valve extending laterally through the sides of said frame and having a spring coiled thereabout to counterbalance said valve and stem, a pressure sensitive device on said frame having a spindle extending through the ends of the latter, an adjustable spring coiled about said spindle for regulating said device, a lever pivotally carried by said frame and cooperating with said spindle and stem to actuate said valve, and a cushioning spring cooperating with said lever to absorb the shock of seating of said valve.

4. In an automatic valve, the combination with a valve housing having a valve and seat therefor, of a housing frame carried by said valve housing, a stem for said valve sliding longitudinally in bearings in the sides of said frame, a spring attached to said stem to counterbalance the latter and said valve, a cushioning spring attached to said spindle, a pressure sensitive device on said frame having a spindle slidable longitudinally in bearings in the ends of said frame, a spring adjustably attached to said spindle to regulate said device, a lever having arms of different length with the longer thereof connected with said spindle and the shorter bearing on said cushioning spring, and means for adjusting the length of said stem.

5. In an automatic valve, the combination with a conduit to be controlled, a valve for said conduit and a housing therefor provided with a seat, of a substantially plane shaped frame on said housng arranged in a plane passing through said conduit, a stem for said valve sliding in bearings in opposite sides of said frame, a pressure sensitive device at one end of said frame having a spindle extending therethrough transversely of said valve stem, a bell crank having arms of different length with the longer cooperating with said spindle and the shorter with said stem, spring means counterbalancing said valve and stem, adjustable spring means regulating said device, and a cushioning spring for absorbing the shock of seating of said vale.

HARRY Y. NORWOOD.